Patented July 11, 1939

2,165,522

UNITED STATES PATENT OFFICE 2,165,522

INK AND THE MARKING OF TEXTILE MATERIALS

William Ivan Taylor and Leslie Brisbane Gibbins, Spondon, near Derby, England, assignors to Celanese Corporation of America, a corporation of Delaware No Drawing. Application April 2, 1937, Serial No. 134,524. In Great Britain April 18, 1936

8 Claims. (Cl. 134—34)

This invention relates to the marking of textile materials and to compositions suitable for this operation.

In establishments dealing with the dyeing, finishing and the like of textile materials, it is usually essential to be able to identify individual batches of material, lengths of fabric, garments or the like throughout their progress through the factory. This is most conveniently done by applying distinctive markings to the individual lengths of material, etc. It is, of course, essential that the markings applied should resist the dyeing and other treatments applied to the materials. Unfortunately the ink preparations available for marking textiles are usually troublesome to use or yield markings which are insufficiently resistant to the processing to which the fabrics may be subjected. For this reason it is not uncommon to identify the batches of textile material by distinctive markings formed of coloured threads sewn into the materials, obviously a very expensive and time-consuming operation.

We have found that the marking of cellulose ester or ether textiles for identification purposes during processing can very satisfactorily be effected by means of a suspension of pigment in a liquid containing a solvent or swelling agent, preferably a strong swelling agent, for the cellulose ester or ether of the material. By this means markings can be obtained which resist dyeing and finishing treatments and enable expensive expedients such as the sewing in of coloured threads or the attaching of marked cotton tabs to be avoided.

According to the present invention, therefore, an ink for marking cellulose ester or ether materials consists of a suspension of pigment in a liquid containing a solvent or swelling agent for the material to be treated. The invention also includes methods of marking cellulose ester or ether materials employing such inks.

Preferably the solvent or swelling agent employed has a boiling point above about 150° C., and advantageously a boiling point between about 150 and 250° C. Solvents or swelling agents having such comparatively high boiling points are advantageous in that with their aid marking inks may be prepared which are very suitable for application by means of rubber stamps or the like, and particularly by means of stamps of the revolving number type.

The liquid content of the ink may consist substantially wholly of solvent or swelling agent for the cellulose ester or ether. However, the solvent or swelling agent may be used in admixture with non-solvent or non-swelling substances, e. g. water. Preferably the liquid content of the inks comprises a substantial proportion of solvent or swelling agent, for example 40, 50 or 60% or more by weight, e. g. 80% or more.

It is generally desirable that the inks should be substantially free from solid thickening agents, e. g. gums, starch and dextrin, and film-forming substances such as cellulose esters or ethers. Inks containing such substances are generally unsuitable for application by means of rubber stamps or the like since they quickly clog the stamp and also the pad which is usually required for inking a rubber stamp.

The inks may be prepared with various solvents or swelling agents for cellulose esters or ethers. It has however been found of advantage to use esters of lower aliphatic mono-carboxylic acids with polyhydric alcohols, which term is used as including dihydric alcohols. Thus the esters generally of lower aliphatic mono-carboxylic acids, particularly acetic or formic acid, with glycols or glycerine, for example ethylene glycol diacetate and glycerine mono-, di- or tri-acetate, may be used in marking materials on which they have the requisite solvent or swelling action. Glycol mono-acetate and glycerine mono-acetate in particular each give very good results in inks for use on cellulose acetate materials. The partial esters of polyhydric alcohols, especially the mono esters, e. g. glycol mono-acetate and glycerine mono-acetate, are generally to be preferred. Again, benzyl esters may be used, for example benzyl acetate, or esters of hydroxy-carboxylic acids, for example ethyl lactate or diethyl tartrate. Other useful solvents or swelling agents are ethylene chlorhydrin or other chlorhydrin, for example glycerine mono- or di-chlorhydrin. Again, alcohols which are solvents or swelling agents for cellulose esters or ethers may be employed, e. g. diacetone alcohol, or benzyl alcohol.

Glycol mono-acetate has been found particularly useful in that it dries rapidly when stamped on to cellulose acetate textile materials and yet has a sufficiently low degree of volatility to enable it to be conveniently used with a rubber or other stamp. Moreover it does not attack rubber.

If desired mixtures of solvents and/or swelling agents for cellulose esters or ethers may be employed. For instance a mixture of glycol mono-acetate, glycol diacetate and glycol, e. g. a crude acetylation product of glycol, may be used in preparing inks for use on cellulose acetate materials.

It is desirable that the ink should be of suitable viscosity for convenient application by means of a rubber stamp or the like. If the solvent or swelling agent is not of itself of the desired viscosity, it may be mixed with another liquid, whether a solvent or swelling agent or not, for the purpose of adjusting the viscosity of the ink to the desired value. A content (e. g. 5 to 15%) of glycerol, butylene glycol or other polyhydric alcohol or like viscous liquid is often useful for this purpose. For example a liquid very suitable for the purposes of the invention consists of a mixture of about 90 parts by weight of glycol mono-acetate and 10 parts by weight of glycerine. Its viscosity is such that inks prepared therewith can very easily be applied by means of a rubber stamp, the latter being inked by means of a pad to which the ink has been applied. Moreover, the inks do not injure rubber and the inking pad remains moist for a considerable time. When other liquids are used the viscosity thereof is advantageously of the order of that of the above-mentioned mixture of 90 parts of glycol mono-acetate and 10 parts of glycerine.

Carbon black is a most convenient pigment to employ for the purposes of the present invention. Inks prepared therewith yield dark markings which show clearly upon the goods after dyeing the latter in almost any shade. Even after dyeing the material black the marking is frequently quite satisfactory. About 1 to 5 parts, e. g. 2 parts, of carbon black per 100 parts of liquid is a suitable proportion. A particularly useful ink consists of 2 parts of carbon black and 100 parts of the above-mentioned mixture of 90 parts of glycol mono-acetate with 10 parts of glycerine.

Other pigments insoluble in the liquid medium may be employed, for example iron oxide, Prussian blue, ultramarine, titanium dioxide, chrome yellow, vermilion or other inorganic pigments. Again, organic pigments may be employed, for example vat dyestuffs, azo pigment dyes or phthalocyanine pigment colours. Again, the inks may contain in suspension finely divided cellulose material such as wood flour, or the cellulose dust separated from cotton linters. Such cellulose materials are not coloured by the dyes generally used for colouring cellulose ester or ether materials. An addition of the latter character is of value in the case of an ink required to yield markings which are clearly visible even after the material to which they have been applied has been dyed black or other dark shade. An ink pigmented with a mixture of carbon or other black pigment and finely divided cellulose is particularly contemplated.

Having described our invention, what we desire to secure by Letters Patent is:

1. An ink for marking textile materials of an organic derivative of cellulose, consisting of a suspension of pigment in a liquid medium consisting of a mixture of about 95 to 85 parts by weight of an ester of a polyhydric alcohol with a lower fatty monocarboxylic acid with about 5 to 15 parts by weight of a polyhydric alcohol.

2. An ink for marking textile materials of cellulose acetate, consisting of a suspension of 1 to 5 parts by weight of a pigment in a liquid medium consisting of a mixture of about 95 to 85 parts by weight of an ester of a polyhydric alcohol with a lower fatty monocarboxylic acid with about 5 to 15 parts by weight of a polyhydric alcohol.

3. An ink for marking textile materials of cellulose acetate, consisting of a suspension of about 1 to 5 parts by weight of carbon black in a liquid medium consisting of a mixture of about 95 to 85 parts by weight of glycol monoacetate and about 5 to 15 parts by weight of glycerine.

4. An ink for marking textile materials of cellulose acetate, consisting of a suspension of about 2 parts by weight of carbon black in a liquid medium consisting of a mixture of about 90 parts by weight of glycol mono-acetate and about 10 parts by weight of glycerine.

5. A method of marking textile materials of an organic derivative of cellulose, which comprises applying thereto an ink consisting of a suspension of pigment in a liquid medium consisting of a mixture of about 95 to 85 parts by weight of an ester of a polyhydric alcohol with a lower fatty monocarboxylic acid with about 5 to 15 parts by weight of a polyhydric alcohol.

6. A method of marking textile materials of cellulose acetate, which comprises applying thereto an ink consisting of a suspension of about 1 to 5 parts by weight of a pigment in a liquid medium consisting of a mixture of about 95 to 85 parts by weight of an ester of a polyhydric alcohol with a lower fatty monocarboxylic acid with about 5 to 15 parts by weight of a polyhydric alcohol.

7. A method of marking textile materials of cellulose acetate, which comprises applying thereto an ink consisting of a suspension of about 1 to 5 parts by weight of carbon black in a liquid medium consisting of a mixture of about 95 to 85 parts by weight of glycol mono-acetate with about 5 to 15 parts by weight of glycerine.

8. A method of marking textile materials of cellulose acetate, which comprises applying thereto an ink consisting of a suspension of about 2 parts by weight of carbon black in a liquid medium consisting of a mixture of about 90 parts by weight of glycol monoacetate with about 10 parts by weight of glycerine.

WILLIAM IVAN TAYLOR.
LESLIE BRISBANE GIBBINS.